United States Patent
Walton et al.

(10) Patent No.: US 9,932,791 B2
(45) Date of Patent: Apr. 3, 2018

(54) SELECTIVE RESTORATION OF FLUID COMMUNICATION BETWEEN WELLBORE INTERVALS USING DEGRADABLE SUBSTANCES

(71) Applicant: HALLIBURTON ENERGY SERVICES, INC., Houston, TX (US)

(72) Inventors: Zachary W. Walton, Carrollton, TX (US); Michael L. Fripp, Carrollton, TX (US); Zachary R. Murphree, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/419,760

(22) PCT Filed: Feb. 14, 2014

(86) PCT No.: PCT/US2014/016528
§ 371 (c)(1),
(2) Date: Feb. 5, 2015

(87) PCT Pub. No.: WO2015/122913
PCT Pub. Date: Aug. 20, 2015

(65) Prior Publication Data
US 2016/0340995 A1 Nov. 24, 2016

(51) Int. Cl.
| | |
|---|---|
| *E21B 33/12* | (2006.01) |
| *E21B 29/02* | (2006.01) |
| *E21B 34/06* | (2006.01) |
| *C08L 67/04* | (2006.01) |
| *C22C 12/00* | (2006.01) |
| *E21B 33/134* | (2006.01) |

(Continued)

(52) U.S. Cl.
CPC .............. *E21B 29/02* (2013.01); *C08L 67/04* (2013.01); *C22C 12/00* (2013.01); *E21B 33/12* (2013.01); *E21B 33/134* (2013.01); *E21B 33/16* (2013.01); *E21B 34/063* (2013.01); *E21B 43/14* (2013.01)

(58) Field of Classification Search
CPC ........ E21B 29/02; E21B 33/12; E21B 33/134; E21B 33/16; E21B 34/063; E21B 43/14
USPC ....................................................... 166/376
See application file for complete search history.

(56) References Cited

U.S. PATENT DOCUMENTS

| | | |
|---|---|---|
| 8,424,610 B2 | 4/2013 | Newton et al. |
| 8,425,651 B2 | 4/2013 | Xu et al. |
| 2008/0066924 A1 | 3/2008 | Xu |

(Continued)

OTHER PUBLICATIONS

Australian Examination Report dated Mar. 20, 2017; Australian Patent Application No. 2014382670.

(Continued)

*Primary Examiner* — Taras P Bemko
(74) *Attorney, Agent, or Firm* — McGuireWoods LLP (57) ABSTRACT

Methods of removing two or more isolation devices is provided. An example method includes introducing two or more isolation devices into a wellbore comprising at least two wellbore intervals. Each isolation device comprises a substance and each of the substances degrades within the wellbore. The degradation rate of each of the substances causes fluid communication to be restored between the wellbore intervals in a desired amount of time. The method further includes causing or allowing each of the substances to degrade.

24 Claims, 3 Drawing Sheets

(51) Int. Cl.
*E21B 33/16* (2006.01)
*E21B 43/14* (2006.01)

(56) References Cited

U.S. PATENT DOCUMENTS

| | | | |
|---|---|---|---|
| 2008/0135249 A1* | 6/2008 | Fripp | E21B 33/1208 166/285 |
| 2008/0164029 A1* | 7/2008 | Rogers | E21B 34/14 166/290 |
| 2008/0249637 A1* | 10/2008 | Asgari | A61F 2/28 623/23.72 |
| 2009/0065216 A1 | 3/2009 | Frazier | |
| 2010/0032151 A1* | 2/2010 | Duphorne | E21B 23/02 166/55 |
| 2010/0270031 A1* | 10/2010 | Patel | E21B 33/1208 166/376 |
| 2010/0294510 A1 | 11/2010 | Holmes | |
| 2011/0132621 A1 | 6/2011 | Agrawal et al. | |
| 2012/0118583 A1 | 5/2012 | Johnson et al. | |
| 2012/0318513 A1 | 12/2012 | Mazyar et al. | |
| 2013/0004664 A1* | 1/2013 | Agrawal | E21B 41/00 427/192 |
| 2013/0029886 A1 | 1/2013 | Mazyar et al. | |
| 2013/0032357 A1* | 2/2013 | Mazyar | E21B 41/00 166/376 |
| 2013/0133897 A1 | 5/2013 | Baihly et al. | |
| 2013/0240200 A1* | 9/2013 | Frazier | E21B 33/134 166/135 |
| 2013/0292123 A1 | 11/2013 | Murphree et al. | |
| 2013/0327540 A1 | 12/2013 | Hamid et al. | |
| 2013/0333890 A1 | 12/2013 | Dagenais et al. | |

OTHER PUBLICATIONS

European Extended Search Report dated Sep. 12, 2017; European Application No. 14882618.3.

* cited by examiner

SELECTIVE RESTORATION OF FLUID COMMUNICATION BETWEEN WELLBORE INTERVALS USING DEGRADABLE SUBSTANCES

TECHNICAL FIELD

Isolation devices can be used to separate one subterranean formation zone from another and prevent fluid flow between wellbore intervals. The isolation devices can be removed after use such that fluid communication is restored. It is often desirable to selectively remove the isolation devices at different times or to remove all the isolation devices at the same time.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more substances, zones, wellbore intervals, layers, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (21.7° C.) and a pressure of one atmosphere "atm" (0.1 megapascals "MPa"). A fluid can be a liquid or gas.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is not uncommon for a wellbore to extend several hundreds of feet or several thousands of feet into a subterranean formation. The subterranean formation can have different zones. A zone is an interval of rock differentiated from surrounding rocks on the basis of its fossil content or other features, such as faults or fractures. For example, one zone can have a higher permeability compared to another zone. It is often desirable to treat one or more locations within multiples zones of a formation. One or more zones of the formation can be isolated within the wellbore via the use of an isolation device. An isolation device can be used to create more than one wellbore interval, wherein at least one wellbore interval can correspond to a formation zone, and functions to block fluid flow within a tubular, such as a tubing string, or within an annulus. The blockage of fluid flow prevents the fluid from flowing into the wellbore intervals located below the isolation device and isolates the formation zone of interest. As used herein, the relative term "below" means at a location further away from a wellhead and "above" means at a location closer to the wellhead compared to a reference object. In this manner, treatment techniques can be performed within the zone of interest.

Common isolation devices include, but are not limited to, a ball, a plug, a bridge plug, a wiper plug, and a packer. It is to be understood that reference to a "ball" is not meant to limit the geometric shape of the ball to spherical, but rather is meant to include any device that is capable of engaging with a seat. A "ball" can be spherical in shape, but can also be a dart, a bar, or any other shape. Zonal isolation can be accomplished, for example, via a ball and seat by dropping or flowing the ball from the wellhead onto a seat that is located within the wellbore. The ball engages with the seat, and the seal created by this engagement prevents fluid communication into other wellbore intervals downstream of the ball and seat. In order to treat more than one formation zone using a ball and seat, the wellbore can contain more than one ball seat. For example, a seat can be located adjacent to each zone. Generally, the inner diameter (I.D.) of the ball seats are different for each wellbore interval. For example, the I.D. of the ball seats sequentially decrease at each interval, moving from the wellhead to the bottom of the well. In this manner, a smaller ball is first dropped into a first zone that is the farthest downstream; that zone is treated; a slightly larger ball is then dropped into another zone that is located upstream of the first zone; that zone is then treated; and the process continues in this fashion—moving upstream along the wellbore—until all the desired wellbore intervals have been created. As used herein, the relative term "upstream" means at a location closer to the wellhead.

A bridge plug is composed primarily of slips, a plug mandrel, and a rubber sealing element. A bridge plug can be introduced into a wellbore and the sealing element can be caused to block fluid flow into downstream zones. A packer generally consists of a sealing device, a holding or setting device, and an inside passage for fluids. A packer can be used to block fluid flow through the annulus located between the outside of a tubular and the wall of the wellbore or inside of a casing.

Isolation devices can be classified as permanent or removable. While permanent isolation devices are generally designed to remain in the wellbore after use, removable devices are capable of being removed after use. It is often desirable to use a removable isolation device in order to restore fluid communication between one or more zones. Traditionally, isolation devices are removed by inserting a retrieval tool into the wellbore, wherein the retrieval tool engages with the isolation device, attaches to the isolation device, and the isolation device is then removed from the wellbore. Another way to remove an isolation device from the wellbore is to mill at least a portion of the device. Yet, another way to remove an isolation device is to contact the device with a solvent, such as an acid, thus dissolving all or a portion of the device.

However, some of the disadvantages to using traditional methods to remove a removable isolation device include: it can be difficult and time consuming to use a retrieval tool; milling can be time consuming and costly; and premature dissolution of the isolation device can occur. For example, premature dissolution can occur if acidic fluids are used in the well prior to the time at which it is desired to dissolve the isolation device.

Other methods to remove a removable isolation device include having a portion of the isolation device made from a material that undergoes a phase transition after a desired amount of time at the bottomhole temperature of a well. The bottomhole temperature of a well varies significantly, depending on the subterranean formation, and can range from about 100° F. to about 600° F. (about 37.8° C. to about 315.6° C.). As used herein, the term "bottomhole" means at the location of the isolation device. As used herein, a "phase transition" means any change that occurs to the physical properties of the substance. As used herein, a "phase transition" can include, without limitation, a change in the phase of the substance (i.e., from a solid to a liquid or semi-liquid, from a liquid or semi-liquid to a gas, etc.), a glass transition, a change in the amount of crystallinity of the substance, physical changes to the amorphous and/or crystalline portions of the substance, corrosion, and any combinations thereof. The glass transition can occur in the amorphous regions of the substance. A substance will undergo a phase transition at a "phase transition temperature." As used herein, a "phase transition temperature" includes a single temperature and a range of temperatures at which the substance undergoes a phase transition. Therefore, it is not necessary to continually specify that the phase transition temperature can be a single temperature or a range of temperatures throughout. By way of example, a substance will have a glass transition temperature or range of temperatures, symbolized as $T_g$. The $T_g$ of a substance is generally lower than its melting temperature $T_m$.

However, the options of elements available for use in these circumstances are severely limited because there are a limited number of elements to choose from and each element, for example, has a single, unique melting point at a given pressure. A different material may have to be used that has a melting point equal to or less than the bottomhole temperature of the well. A composition of two or more substances will have a phase transition that is different from the phase transitions of the individual substances making up the mixture. The use of various compositions increases the number of phase transition temperatures that are available for use. In this manner, one can determine the bottomhole temperature and pressure of a well and then select the appropriate composition for use at that temperature and pressure.

A eutectic composition is a mixture of two or more substances that undergoes a phase transition at a lower temperature than all of its pure constituent components. A solid-liquid phase transition temperature can also be referred to as the freezing point or melting point of a substance or composition. The substances making up the eutectic composition can be compounds, such as metal alloys (including fusible alloys) or thermoplastics, or metallic elements. By way of example, the melting point of bismuth at atmospheric pressure (101 kilopascals) is 520° F. (271.1° C.) and the melting point of lead is 621° F. (327.2° C.); however, the melting point of a composition containing 55.5% bismuth and 44.5% lead has a melting point of 244° F. (117.8° C.). As can be seen the bismuth-lead composition has a much lower melting point than both, elemental bismuth and elemental lead. Not all compositions have a melting point that is lower than all of the individual substances making up the composition. By way of example, a composition of silver and gold has a higher melting point compared to pure silver, but is lower than that of pure gold. Therefore, a silver-gold composition cannot be classified as a eutectic composition.

A eutectic composition can also be differentiated from other compositions because it solidifies (or melts) at a single, sharp temperature. It is to be understood that the phrases "phase transition" and "solid-liquid phase transition," the term "melt" and all grammatical variations thereof, and the term "freeze" and all grammatical variations thereof are meant to be synonymous. Non-eutectic compositions generally have a range of temperatures at which the composition melts. There are other compositions that can have both: a range of temperatures at which the composition melts; and a melting point less than at least one of the individual substances making up the composition. These other substances can be called hypo- and hyper-eutectic compositions. A hypo-eutectic composition contains the minor substance (i.e., the substance that is in the lesser concentration) in a smaller amount than in the eutectic composition of the same substances. A hyper-eutectic composition contains the minor substance in a larger amount than in the eutectic composition of the same substances. Generally, with few exceptions, a hypo- and hyper-eutectic composition will have a phase transition temperature higher than the eutectic transition temperature but less than the melting point of the individual substances making up the composition.

The following table illustrates a eutectic, hypo- and hyper-eutectic composition, the concentration of each substance making up the composition (expressed as a % by weight of the composition), and their corresponding transition temperature and melting temperature ranges. As can be seen, the hyper-eutectic composition contains cadmium (the minor substance) in a larger amount than the eutectic composition, and the hypo-eutectic composition contains cadmium in a smaller amount than in the eutectic composition. As can also be seen, both the hyper- and hypo-eutectic compositions have a range of melting points; whereas, the eutectic composition has a single melting temperature. Moreover, all 3 compositions have a transition temperature or melting point range that is lower than each of the 4 individual elements—Bi equals 520° F. (271.1° C.), Pb equals 621° F. (327.2° C.), Sn equals 450° F. (232.2° C.), and Cd equals 610° F. (321.1° C.).

| Type of Composition | Conc. of Bismuth (Bi) | Conc. of Lead (Pb) | Conc. of Tin (Sn) | Conc. of Cadmium (Cd) | Melting Temperature (° F.) |
| --- | --- | --- | --- | --- | --- |
| Eutectic | 50 | 26.7 | 13.3 | 10 | 158 |
| Hyper-eutectic | 50 | 25 | 12.5 | 12.5 | 158-165 |
| Hypo-eutectic | 50.5 | 27.8 | 12.4 | 9.3 | 158-163 |

A fusible alloy can be a eutectic composition. As used herein, the term "fusible alloy" means an alloy wherein at least one phase of the alloy has a melting point below 482° F. (250° C.). As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin.

Other methods to remove a retrievable isolation device include having a portion of the isolation device made from a material that undergoes galvanic corrosion after a desired amount of time within the wellbore. Galvanic corrosion occurs when two different metals or metal alloys are in electrical connectivity with each other and both are in contact with an electrolyte. As used herein, the phrase "electrical connectivity" means that the two different metals or metal alloys are either touching, in close enough proximity to each other, or are connected via a low resistance electrical conductor, such that when the two different metals are in contact with an electrolyte, the electrolyte becomes conductive and ion migration occurs between one of the metals and the other metal, and is not meant to require an actual physical connection between the two different metals, for example, via a metal wire. It is to be understood that as used herein, the term "metal" is meant to include pure metals and also metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy.

The metal that is less noble, compared to the other metal, will dissolve in the electrolyte. The less noble metal is often referred to as the anode, and the more noble metal is often referred to as the cathode. Galvanic corrosion is an electrochemical process whereby free ions in the electrolyte make the electrolyte electrically conductive, thereby providing a means for ion migration from the anode to the cathode—resulting in deposition formed on the cathode. Metals can be arranged in a galvanic series. The galvanic series lists metals in order of the most noble to the least noble. An anodic index lists the electrochemical voltage (V) that develops between a metal and a standard reference electrode (gold (Au)) in a given electrolyte. The actual electrolyte used can affect where a particular metal or metal alloy appears on the galvanic series and can also affect the electrochemical voltage. For example, the dissolved oxygen content in the electrolyte can dictate where the metal or metal alloy appears on the galvanic series and the metal's electrochemical voltage. The anodic index of gold is −0 V; while the anodic index of beryllium is −1.85 V. A metal that has an anodic index greater than another metal is more noble than the other metal and will function as the cathode. Conversely, the metal that has an anodic index less than another metal is less noble and functions as the anode. In order to determine the relative voltage between two different metals, the anodic index of the lesser noble metal is subtracted from the other metal's anodic index, resulting in a positive value.

There are several factors that can affect the rate of galvanic corrosion. One of the factors is the distance separating the metals on the galvanic series chart or the difference between the anodic indices of the metals. For example, beryllium is one of the last metals listed at the least noble end of the galvanic series and platinum is one of the first metals listed at the most noble end of the series. By contrast, tin is listed directly above lead on the galvanic series. Using the anodic index of metals, the difference between the anodic index of gold and beryllium is 1.85 V; whereas, the difference between tin and lead is 0.05 V. This means that galvanic corrosion will occur at a much faster rate for magnesium or beryllium and gold compared to lead and tin.

The following is a partial galvanic series chart using a deoxygenated sodium chloride water solution as the electrolyte. The metals are listed in descending order from the most noble (cathodic) to the least noble (anodic). The following list is not exhaustive, and one of ordinary skill in the art is able to find where a specific metal or metal alloy is listed on a galvanic series in a given electrolyte.

PLATINUM
GOLD
ZIRCONIUM
GRAPHITE
SILVER
CHROME IRON
SILVER SOLDER
COPPER - NICKEL ALLOY 80-20
COPPER - NICKEL ALLOY 90-10
MANGANESE BRONZE (CA 675), TIN BRONZE (CA903, 905)
COPPER (CA102)
BRASSES
NICKEL (ACTIVE)
TIN
LEAD
ALUMINUM BRONZE
STAINLESS STEEL
CHROME IRON
MILD STEEL (1018), WROUGHT IRON
ALUMINUM 2117, 2017, 2024
CADMIUM
ALUMINUM 5052, 3004, 3003, 1100, 6053
ZINC
MAGNESIUM
BERYLLIUM

The following is a partial anodic index listing the voltage of a listed metal against a standard reference electrode (gold) using a deoxygenated sodium chloride water solution as the electrolyte. The metals are listed in descending order from the greatest voltage (most cathodic) to the least voltage (most anodic). The following list is not exhaustive, and one of ordinary skill in the art is able to find the anodic index of a specific metal or metal alloy in a given electrolyte.

Anodic index

| Metal | Index (V) |
|---|---|
| Gold, solid and plated, Gold-platinum alloy | −0.00 |
| Rhodium plated on silver-plated copper | −0.05 |
| Silver, solid or plated; monel metal. High nickel-copper alloys | −0.15 |
| Nickel, solid or plated, titanium an s alloys, Monel | −0.30 |
| Copper, solid or plated; low brasses or bronzes; silver solder; German silvery high copper-nickel alloys; nickel-chromium alloys | −0.35 |
| Brass and bronzes | −0.40 |
| High brasses and bronzes | −0.45 |
| 18% chromium type corrosion-resistant steels | −0.50 |
| Chromium plated; tin plated; 12% chromium type corrosion-resistant steels | −0.60 |
| Tin-plate; tin-lead solder | −0.65 |
| Lead, solid or plated; high lead alloys | −0.70 |
| 2000 series wrought aluminum | −0.75 |
| Iron, wrought, gray or malleable, plain carbon and low alloy steels | −0.85 |
| Aluminum, wrought alloys other than 2000 series aluminum, cast alloys of the silicon type | −0.90 |
| Aluminum, cast alloys other than silicon type, cadmium, plated and chromate | −0.95 |
| Hot-dip-zinc plate; galvanized steel | −1.20 |
| Zinc, wrought; zinc-base die-casting alloys; zinc plated | −1.25 |
| Magnesium & magnesium-base alloys, cast or wrought | −1.75 |
| Beryllium | −1.85 |

Another factor that can affect the rate of galvanic corrosion is the temperature and concentration of the electrolyte. The higher the temperature and concentration of the electrolyte, the faster the rate of corrosion. Yet another factor that can affect the rate of galvanic corrosion is the total amount of surface area of the least noble (anodic) metal. The greater surface area that the anode can come in contact with the electrolyte, the faster the rate of corrosion. The cross-sectional size of the anodic metal pieces can be decreased in order to increase the total amount of surface area per total volume of the material. Yet another factor that can affect the rate of galvanic corrosion is the ambient pressure. Depending on the electrolyte chemistry and the two metals, the corrosion rate can be slower at higher pressures than at lower pressures if gaseous components are generated.

There are several desirable characteristics of an isolation device. For example, it is desirable that the isolation device be able to withstand downhole pressure differentials. As used herein, the term "withstand," and all grammatical variations thereof means that the substance does not crack, break, or collapse. This is important so the isolation device can function to create the wellbore interval and isolate one formation zone from another by preventing fluid flow past the device. For a ball and seat isolation device, the larger the outer diameter "O.D." of the ball, the more area there is for pressure forces to act on. Therefore, in order for a larger ball to be capable of withstanding a specific pressure differential, the interference (i.e., the area of the ball that comes in contact with the seat) can be increased so more of the ball is in engagement with the seat.

A desirable characteristic of using multiple isolation devices is for each isolation device to have a desired sealing time. As used herein, the "sealing time" is the time that the isolation device functions to seal an area within a wellbore by preventing or substantially reducing fluid flow past the device. For example, a ball can function to seal the area when engaged with a seat. Therefore, once a ball becomes unseated, then the seal is broken and fluid communication is restored between wellbore intervals. In certain oil and gas operations, such as production, it may be desirable for the isolation devices to have the same sealing times. It may be advantageous to increase the rate of degradation of a removable isolation device in certain areas of the wellbore so operators do not have to waste valuable time waiting for those isolation devices to lose their sealing capability. For example, the larger O.D. balls towards the heel of a wellbore generally have a larger interference compared to balls located towards the toe of the wellbore. Therefore, it generally takes longer for the larger balls to become unseated because more of the degradable substance has to degrade to unseat the ball. As a result, it may be desirable to increase the rate of degradation for the larger balls so all the balls become unseated at approximately the same time. However, it may also be desirable for the isolation devices to lose their sealing capability at different times. For example, it may be desirable for the isolation devices located closer to the toe of the wellbore to lose their sealing capability before or after the isolation devices located closer to the heel of the wellbore.

There is a need for selectively causing wellbore isolation devices to lose their sealing capability and restore fluid communication between wellbore intervals.

According to an embodiment, a method of removing two or more isolation devices comprises: introducing the two or more isolation devices into a wellbore, wherein the wellbore comprises at least two wellbore intervals, wherein each isolation device comprises a substance, wherein each of the substances degrades within the wellbore, and wherein the degradation rate of each of the substances causes fluid communication to be restored between the wellbore intervals in a desired amount of time; and causing or allowing each of the substances to undergo the phase transition.

According to another embodiment, a well system comprises: the wellbore; and the two or more isolation devices.

Any discussion of the embodiments regarding the isolation device or any component related to the isolation device (e.g., the substance) is intended to apply to all of the method and system embodiments. Any discussion of a particular component of an embodiment (e.g., a substance) is meant to include the singular form of the component and also the plural form of the component, without the need to continually refer to the component in both the singular and plural form throughout. For example, if a discussion involves "the substance 51," it is to be understood that the discussion pertains to one particular substance (singular) and two or more substances (plural).

Figure 1:
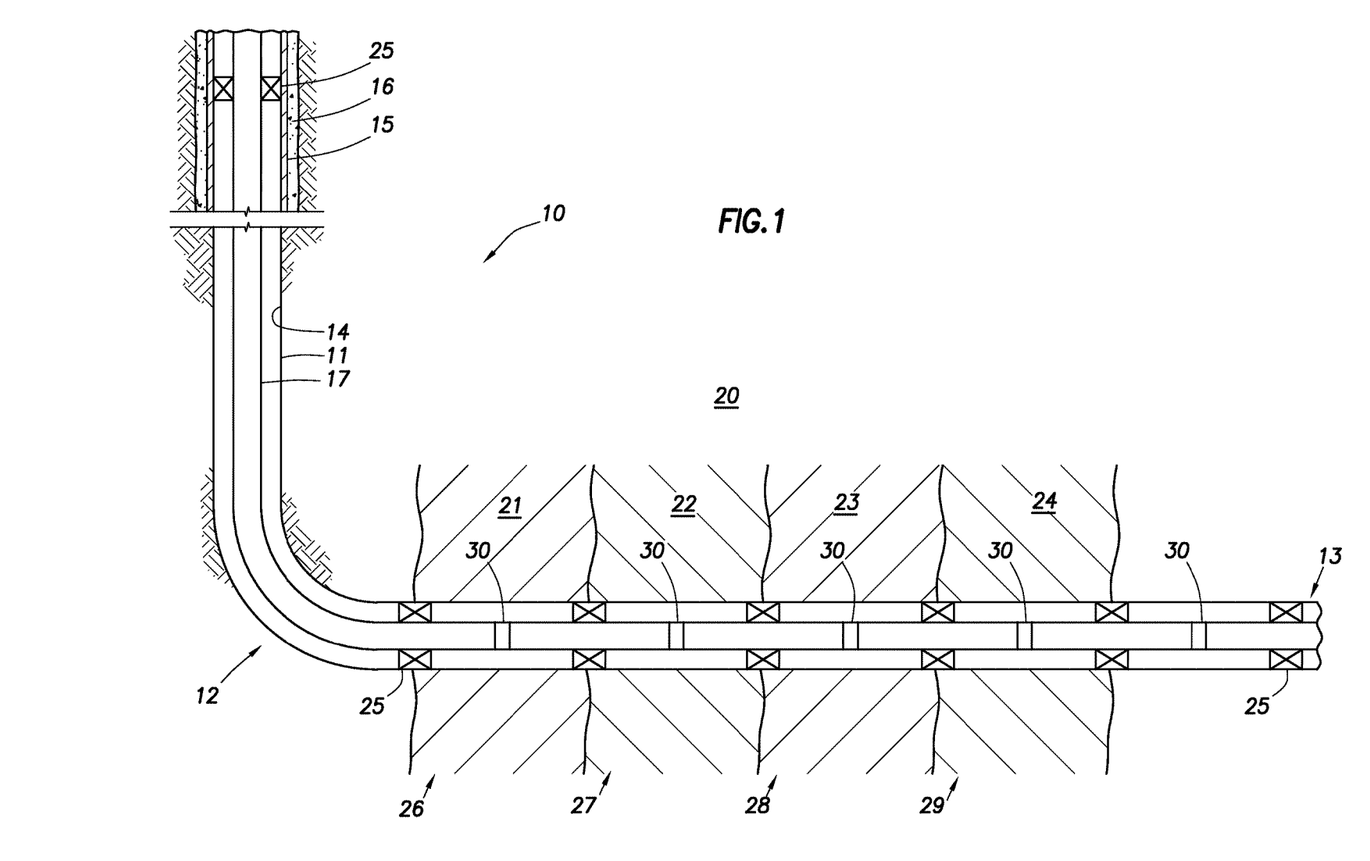
FIG. 1 is a schematic illustration of a well system containing more than one isolation device.
Figure 2:
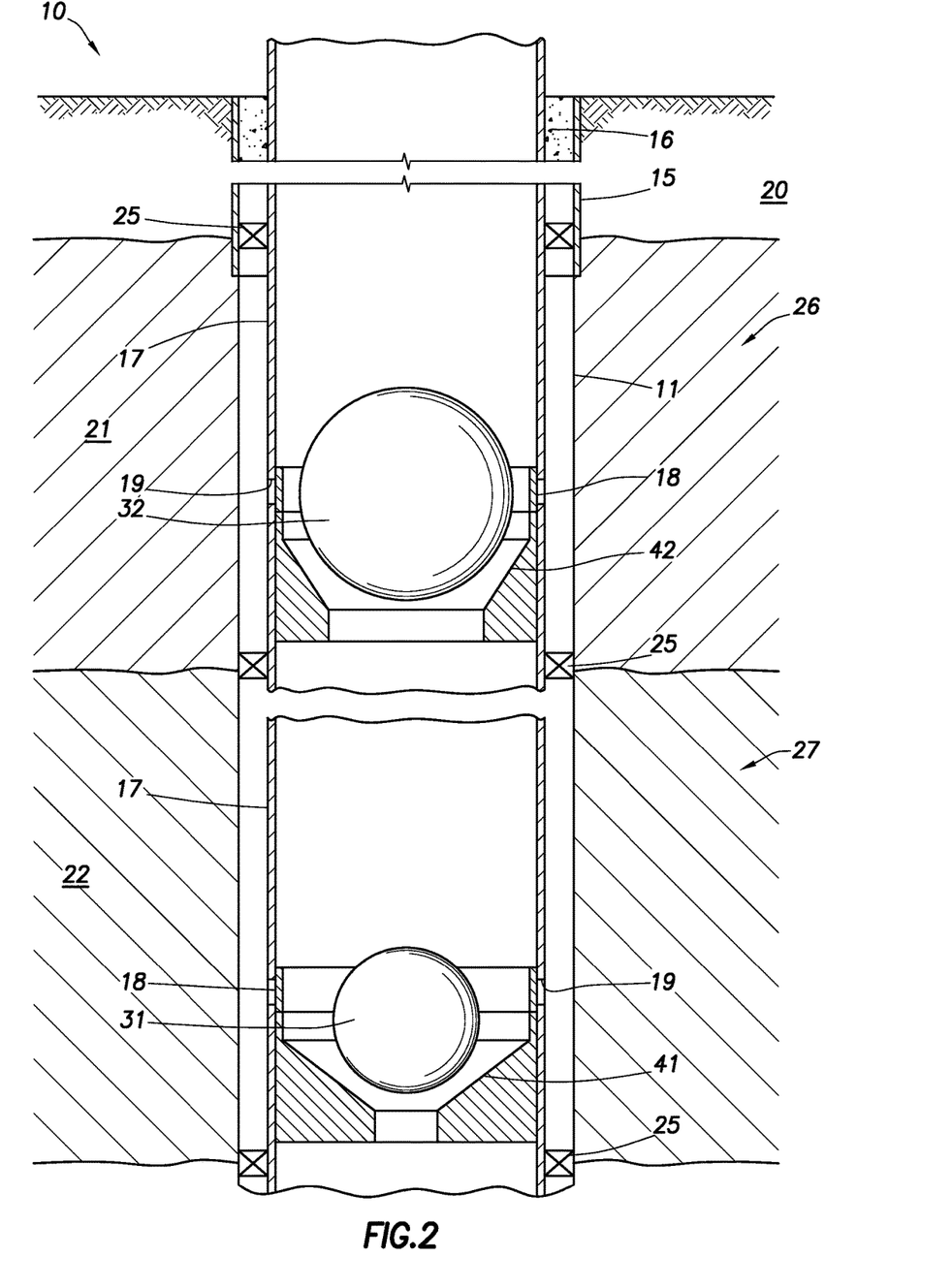
FIG. 2 is an enlarged schematic illustration of FIG. 1 showing two zones, wellbore intervals, and isolation devices.

Turning to the Figures, FIGS. 1 and 2 depict an example of a well system 10. The well system 10 can include at least one wellbore 11. The wellbore 11 can penetrate a subterranean formation 20. The subterranean formation 20 can be a portion of a reservoir or adjacent to a reservoir. The wellbore 11 can include a casing 15 and/or an uncased section 14. The casing 15 can be secured within the wellbore 11 with cement 16. The wellbore 11 can include a generally vertical wellbore section or can include a generally horizontal wellbore section or a combination thereof. The wellbore 11 can also include a heel 12 and a toe 13. A tubing string 17 can be installed in the wellbore 11. As can be seen in FIG. 2, the tubing string 17 can include a port 19 or multiple ports. The tubing string 17 can also include a sliding sleeve 18 that is located adjacent to the port. The sliding sleeve 18 can expose the port 19 when the sleeve is in an open position and close off the port when the sleeve is in a closed position. When the port is exposed, fluid can flow through the port and into an annulus of the wellbore and/or the subterranean formation 20. The ports can be used to perform an oil or gas operation.

Still referring to FIGS. 1 and 2, the subterranean formation 20 can include at least a first zone 21 and a second zone 22. The subterranean formation 20 can also include more than two zones, for example, a third zone 23, a fourth zone 24, and so on. The wellbore contains at least two wellbore intervals. The wellbore can include a first wellbore interval 26, a second wellbore interval 27, and optionally more than two intervals, for example, a third wellbore interval 28, a fourth wellbore interval 29, and so on. The wellbore intervals can be created, for example via one or more packers 25. However, according to an embodiment, the isolation devices are the packers 25. The packers 25 can be used to help prevent fluid flow between the at least two wellbore intervals (e.g., between the first wellbore interval 26 and the second wellbore interval 27) within an annulus. Each wellbore interval can correspond to a subterranean formation zone. For example, the first wellbore interval 26 can correspond to the first zone 21 and the second wellbore interval 27 can correspond to the second zone 22. There can also be more than one wellbore interval per zone.

It should be noted that the well system 10 is illustrated in the drawings and described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, the well system 10 can further include a well screen. By way of another example, cement may be used instead of packers 25 to aid the isolation devices in providing zonal isolation. Cement may also be used in addition to packers 25.

The isolation devices 30 can be a ball and a seat, a plug, a bridge plug, a wiper plug, or a packer. The isolation devices 30 can restrict fluid flow past the device. The isolation devices may be a free falling device, may be a pumped-down device, or may be tethered to the surface. As shown in FIG. 2, the isolation devices 30 can be balls (e.g., a first ball 31 and a second ball 32) and seats 40 (e.g., a first seat 41 and a second seat 42). Of course, for more than two isolation devices, there can be a third ball and seat, a fourth ball and seat, and so on. The ball 30 can engage the seat 40. The seat 40 can be located on the inside of a tubing string 17. The inner diameter (I.D.) of the first seat 41 can be less than the I.D. of the second seat 42. The first ball 31 can have a smaller outer diameter (O.D.) than the second ball 32. The first ball 31 can be introduced into the wellbore 11, fall past the second seat 42 and engage the first seat 41. Fluid can now be temporarily restricted or prevented from flowing into any wellbore intervals located downstream of the second wellbore interval 27. The second ball 32 can then be introduced into the wellbore 11 and engage the second seat 42. Fluid can now be temporarily restricted or prevented from flowing into any wellbore intervals located downstream of the first wellbore interval 26. The ball (whether it be a first ball 31 or a second ball 32) can engage the sliding sleeve 18 during introduction. This engagement with the sliding sleeve 18 can cause the sliding sleeve to move; thus, opening or closing the port 19. The port 19 can also be opened via a variety of other mechanisms instead of a ball. The use of other mechanisms may be advantageous when the isolation devices 30 are not a ball. After placement of the isolation devices 30, fluid can be flowed from, or into, the subterranean formation 20 via one or more opened ports 19 located within a particular wellbore interval. As such, a fluid can be produced from the subterranean formation 20 or injected into the formation.

The isolation devices 30 restrict or prevent fluid flow between the wellbore intervals. By way of example, the isolation devices 30 can be used to restrict or prevent fluid flow between different wellbore intervals within the tubing string 17 while packers 25 and/or cement 16 can be used to restrict or prevent fluid flow between different wellbore intervals within an annulus. The isolation devices 30 do not have to be the same type of isolation device. For example, one isolation device can be a packer while the other isolation device can be a ball and seat or a bridge plug.

Figure 3:
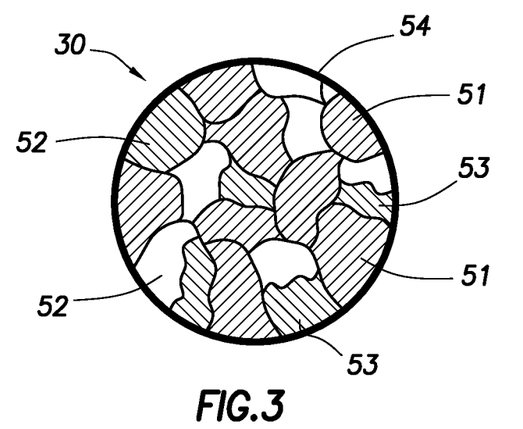
FIG. 3 is a schematic illustration of the isolation device according to an embodiment showing nuggets of a matrix.
Figure 4:
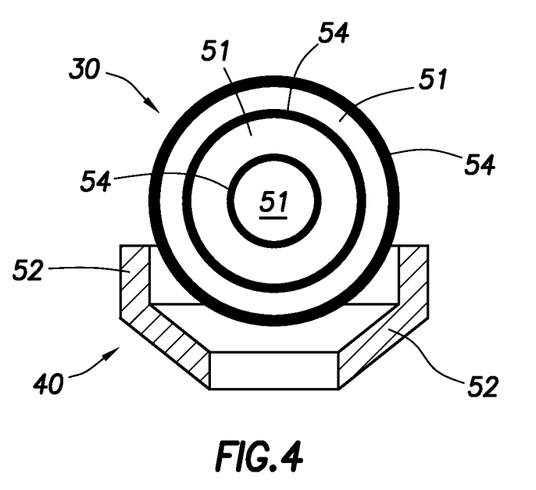
FIG. 4 is a schematic illustration of the isolation device according to another embodiment showing multiple layers.

Turning now to FIGS. 3 and 4, each isolation device 30 comprises a substance 51. The substance 51 for each isolation device can be the same or different. Each isolation device 30 can also comprise more than one substance (e.g., a second 52, a third, a fourth, and so on substances). Each of the substances 51 degrades within the wellbore 11. According to an embodiment, the degradation is melting, dissolving, corroding, or undergoing any chemical degradation, such as hydrolyzing.

According to an embodiment, the substances 51 comprise a metal, a metal alloy, a polymer, or combinations thereof. According to an embodiment, the polymer is a plastic. The plastic can be a thermoplastic, such as polylactic acid "PLA" or polyglycolic acid "PGA." According to another embodiment, the metal alloy is a fusible metal alloy. The metal or the metal of the metal alloy (including a fusible metal alloy) can be selected from the group consisting of, lithium, sodium, potassium, rubidium, cesium, beryllium, magnesium, calcium, strontium, barium, radium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, silver, cadmium, lanthanum, hafnium, tantalum, tungsten, rhenium, osmium, iridium, platinum, gold, graphite, and combinations thereof. Preferably, the metal or metal of the metal alloy is selected from the group consisting of lead, tin, bismuth, indium, cadmium, silver, gallium, zinc, antimony, copper, magnesium, aluminum, and combinations thereof. According to an embodiment, the metal is not a toxic heavy metal. The fusible alloy can also contain a non-metal.

One or more of the isolation devices 30 can include a second substance 52. According to this embodiment, the substance 51 and the second substance 52 can form a eutectic, hypo-eutectic, or hyper-eutectic composition. According to these embodiments, the substances 51, and optionally the second substances 52 have a degradation temperature less than or equal to the bottomhole temperature of the wellbore 11. As used herein, the term "bottomhole" means at the location of the isolation device. According to another embodiment, the substances 51, and optionally the second substances 52 degrade at a temperature that is at least 36° F. (2.2° C.) higher than the surface temperature. In this manner, the substances 51, and optionally the second substances 52 are in a solid state prior to introduction into the wellbore 11. Then, after the isolation devices 30 are introduced into the wellbore 11, the temperature of the area surrounding the isolation devices can increase (for example, due to a cessation of pumping a fluid in which the subterranean formation 20 can increase the wellbore temperature or a heated fluid can be pumped downhole). The temperature can be sufficient to cause at least the substances 51 to degrade such that zonal isolation is no longer achieved.

According to another embodiment, the substances 51 and the second substances 52 are part of a galvanic system. According to this embodiment, the substances 51 are the anode of the system and the second substances 52 are the cathode of the system, wherein the substances 51 undergo galvanic corrosion as the form of degradation. The substances 51 can undergo galvanic corrosion when an electrically conductive path exists between the substances 51 and the second substances 52 and at least a portion of the substances and second substances 51/52 are in contact with an electrolyte. The substances and second substances 51/52 are metals or metal alloys. The metal or metal of the metal alloy can be selected from the group consisting of, lithium, sodium, potassium, rubidium, cesium, beryllium, magnesium, calcium, strontium, barium, radium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, silver, cadmium, lanthanum, hafnium, tantalum, tungsten, rhenium, osmium, iridium, platinum, gold, graphite, and combinations thereof. Preferably, the metal or metal of the metal alloy is selected from the group consisting of beryllium, tin, iron, nickel, copper, zinc, magnesium, aluminum, and combinations thereof. According to an embodiment, the metal is neither radioactive, unstable, toxic, nor theoretical.

According to an embodiment, the substances and second substances 51/52 are different metals or metal alloys. By way of example, the substance 51 can be zinc and the second substance 52 can be steel. Furthermore, the substance 51 can be a metal and the second substance 52 can be a metal alloy. The substances and second substances 51/52 can be a metal and the substances and second substances 51/52 can be a metal alloy. According to an embodiment, the second substance 52 has a greater anodic index than the substance 51. Stated another way, the second substance 52 is listed higher on a galvanic series than the substance 51. According to another embodiment, the second substance 52 is more noble than the substance 51. In this manner, the substance 51 acts as an anode and the second substance 52 acts as a cathode. Moreover, in this manner, the substance 51 (acting as the anode) at least partially dissolves when in electrical connectivity with the second substance 52 and when the substances and second substances 51/52 are in contact with the electrolyte. The second substance 52 can be part of the isolation device 30, the tubing string 17, the seat 40, or any other wellbore component provided that the second substance 52 is in electrical connectivity with the substance 51.

The electrolyte of the galvanic system can be a wellbore fluid or a reservoir fluid. A wellbore fluid can be any type of fluid (e.g., a drilling fluid, spacer fluid, completion fluid, or workover fluid) that is introduced into the wellbore. The oil, gas, or water produced from the wellbore is called a reservoir fluid. As used herein, an electrolyte is any substance containing free ions (i.e., a positive- or negative-electrically charged atom or group of atoms) that makes the substance electrically conductive. The electrolyte can be selected from the group consisting of, solutions of an acid, a base, a salt, and combinations thereof. A salt can be dissolved in water, for example, to create a salt solution. Common free ions in an electrolyte include sodium ($Na^+$), potassium ($K^+$), calcium ($Ca^{2+}$), magnesium ($Mg^{2+}$), chloride ($Cl^-$), hydrogen phosphate ($HPO_4^{2-}$), and hydrogen carbonate ($HCO_3^-$).

The mechanism that causes the degradation can be different for each of the substances. For example, a first isolation device can include a substance that degrades due to melting or hydrolysis while a second isolation device can include a substance that degrades due to galvanic corrosion. Moreover, for groups of isolation devices, the mechanism that causes the degradation can be different for each group.

The isolation device 30 can further include an additive 53. The additive 53 can be an electrolytic compound. The electrolytic compound can dissolve in wellbore fluids to either form the electrolyte or add free ions to an electrolyte wellbore fluid. According to another embodiment, the additive 53 is a pH maintainer. For example, the additive 53 can be a buffering agent. Some reactions, such as galvanic corrosion or hydrolysis, occur in fluids that have a specific pH. By way of example, magnesium hydrolyzes in water when the pH of the water is in the range from −2 to about 11. By way of another example, aluminum is passive (i.e., it does not decompose) when a surrounding fluid has a pH in the range of about 4 to about 8.5, but will decompose at two different pH ranges of −2 to about 4 and about 8.5 to 14. Therefore, the pH maintainer additive 53 can dissolve in the wellbore fluid to maintain the pH of the fluid at a desired pH or range of pH values. Accordingly, the desired pH or range of pH values would be sufficient to allow at least the substances 51 to degrade. According to yet another embodiment, the additive 53 is an insulator.

Preferably, if the isolation devices 30 includes more than one substance, then the substances are intermixed to form the device. As used herein, the term "intermixed" means that all of the substances are relatively uniformly distributed throughout the composition and very few pockets, if any, of just one of the substances exist. The intermixed composition can be formed via a variety of processes known to those of ordinary skill in the art, including but not limited to, powder metallurgy.

The degradation rate of each of the substances 51 causes fluid communication to be restored between the wellbore intervals in a desired amount of time. According to an embodiment, the desired amount of time is approximately the same for each of the wellbore intervals. As used herein, "approximately the same" is meant to include the exact same time or +/−10% of the time (e.g., not exactly the same time, but within a matter of minutes of one another). In this manner, each of the isolation devices 30 can lose their sealing capability and fluid communication can be restored between each of the wellbore intervals at approximately the same time. It may be desirable to use this method of simultaneous restoration of fluid communication for production of a reservoir fluid.

According to another embodiment, the desired amount of time is different for at least two of the wellbore intervals. By way of example, it may be desirable for the isolation devices located near the toe 13 of the wellbore 11 to lose their sealing capability and fluid communication to be restored in the wellbore intervals at or near the toe before the isolation devices located closer to the heel 12. Accordingly, the substances of the isolation devices at or near the toe could undergo the phase transition prior to the substances of the other isolation devices located away from the toe; or due to the smaller O.D. of the devices near the toe, it may take less time to lose sealing capability even though the rate of phase transition is the same for all the devices. This may be desirable, for example, to allow enough pressure to build up within a wellbore interval to unseat (or cause to lose sealing capability) an isolation device located above the previously-unseated device. The desired time could be selected such that the isolation devices progressively become unseated or lose their sealing capability starting at the toe and working upstream towards the heel via a difference in time of the phase transition of each of the substances. Of course, the system can be designed such that the isolation devices lose their sealing capability starting at the heel and working progressively towards the toe. An example of this embodiment may be when the isolation devices are frac plugs and fracturing operations could be performed within the first zone 21, then the substance for the isolation device located within the second wellbore interval 27 could degrade to allow fracturing within the second zone 22, and so on. It is to be understood that the isolation devices can be caused to lose their sealing capability in any sequence and not just the sequences listed herein. For example, the isolation devices located near the middle of the wellbore may lose their sealing capability first, then the toe and then the heel, or then the heel and then the toe. There are varieties of sequences that could be employed with the benefits of this disclosure.

If there are more than two isolation devices 30 in the wellbore 11, then the isolation devices can also be grouped together into two or more groups wherein all of the isolation devices within a particular group have restored fluid communication between those wellbore intervals at approximately the same time. By way of example, the isolation devices 30 located within the first wellbore interval 26 and second wellbore interval 27 may be grouped together into a first group; and the isolation devices located within the third wellbore interval 28 and the fourth wellbore interval 29 may be grouped together into a second group. The groups may be formed, for example, based on the total amount of interference of a ball with a seat, the O.D. of a ball, the desired sequence of restoration of fluid communication for the wellbore intervals, or the phase transition temperature of the compositions (e.g., for eutectic, hypo- or hyper-eutectic compositions). The isolation devices 30 of the first group can lose their sealing capability before or after the isolation devices of the second group. Moreover, the substances of the isolation devices in the first group can have the same degradation rate, and the substances of the isolation devices of the second group can have the same degradation rate, wherein the rates are different for the two groups. The substances of the isolation devices of the first and second group could also have the same degradation rate, but different time periods for fluid communication to be restored, for example, due to a greater seat interference or O.D. of the isolation devices between the groups (i.e., even though the rates are the same, it just takes longer for the degradation to fully occur such that the isolation device loses its sealing capability and fluid communication is restored).

Several factors can determine the degradation rate of each of the substances. For example, a thermoplastic and/or eutectic composition can degrade at the degradation temperature. Generally, the higher the temperature above the degradation temperature of the substance, the faster the degradation rate. According to an embodiment, the substances 51 degrade at or near the bottomhole temperature of the wellbore after a desired amount of time.

There are several factors that can affect the degradation rate via galvanic corrosion of the substance 51. By way of example, in general, the greater the difference between the second substance's 52 anodic index and the substance's 51 anodic index, the faster the degradation rate. By contrast, in general, the less difference between the second substance's 52 anodic index and the substance's 51 anodic index, the slower the degradation rate. By way of yet another example, in general, the farther apart the substance and the second substance are from each other in a galvanic series, the faster the degradation rate; and the closer together they are to each other in the galvanic series, the slower the degradation rate. By evaluating the difference in the anodic index of the substance and second substance, or by evaluating the order in a galvanic series, one of ordinary skill in the art will be able to determine the degradation rate of the substance in a given electrolyte at a given temperature.

Another factor that can affect the degradation rate of the substance 51 via galvanic corrosion is the physical proximity of the substance 51 to the second substance 52. Generally, the closer the substance is physically to the second substance, the faster the degradation rate of the substance. By contrast, generally, the farther apart the substance and second substance are from one another, the slower the degradation rate. It should be noted that the distance between the substance and the second substance should not be so great that an electrically conductive path ceases to exist when galvanic corrosion is the mechanism that causes the degradation.

Another factor that can affect the rate of degradation via galvanic corrosion is the concentration of the electrolyte, the ions in the electrolyte, and the temperature of the electrolyte. The concentration (i.e., the total number of free ions available in the electrolyte) of the electrolyte can be adjusted to control the rate of galvanic corrosion of the substance 51. The concentration can be determined based on at least the specific metals or metal alloys selected for the substance 51 and second substance 52 and the bottomhole temperature of the well. Moreover, because the free ions in the electrolyte enable the electrochemical reaction to occur between the substances by donating its free ions, the number of free ions will decrease as the reaction occurs. At some point, the electrolyte may be depleted of free ions if there are any remaining substance and second substance that have not reacted. If this occurs, the galvanic corrosion that causes the substance to dissolve will stop. In this example, it may be necessary to introduce a second, third, or fourth, and so on, electrolyte(s). As mentioned above, the isolation device 30 can also include an additive that is an electrolytic compound, which dissolves in the wellbore fluids to increase the total number of free ions available for galvanic corrosion. Generally, the higher the concentration of the electrolyte, the faster the degradation rate of the first material, and the lower the concentration of the electrolyte, the slower the degradation rate. Moreover, the higher the temperature of the electrolyte, the faster the rate of degradation of the first material, and the lower the temperature of the electrolyte, the slower the rate of degradation.

As can be seen in FIG. 3, the particle size or size of the nuggets of the substance 51 and/or the second substance 52 can affect the degradation rate. Generally, the smaller the particle size, the more surface area is available for degradation and the degradation rate will increase. Thus, the degradation rate can be increased by decreasing the particle size and can be decreased by increasing the particle size. As can also be seen in FIG. 3, an insulator additive 53 can be included within the isolation device 30. The insulator can physically separate the substance 51 from the second substance 52 to slow the degradation rate. Of course, the additive 53 (whether an electrolytic compound, pH maintainer or insulator) can be selectively positioned within the isolation device 30 either closer to the outer perimeter or closer to the center to allow the degradation rate to change over time. For example, if positioned closer to the center, then upon contact with wellbore fluids, the additive could dissolve and provide the necessary pH or free ions for example, to increase the degradation rate. As can also be seen in FIG. 3, the isolation device 30 can further include a coating 54. The coating can be a compound, such as a wax, thermoplastic, sugar, salt, or polymer. The coating can be selected such that the coating either dissolves in wellbore fluids or melts at a certain temperature. Upon dissolution or melting, at least the substance 51 of the isolation device is available to degrade.

FIG. 4 depicts the isolation device 30 according to another embodiment. The isolation device 30 can include multiple layers of the substance 51 and the coating 54. Although not depicted in FIG. 4, the isolation device 30 can also contain one or more layers of the second substance 52 and/or the additive 53. The number of layers and the thicknesses of each layer can be selected to control the degradation rate.

It is to be understood that each isolation device can have the same or a different construction. The construction can be different by selecting different substances, layers, thicknesses of layers, etc. to make the construction different. The construction can also be selected such that each isolation devices degrades to cause restoration of the fluid communication at the desired time. The degradation rates should be selected for each isolation device or group of isolation devices such that fluid communication is restored in the desired amount of time depending on the specific oil or gas operation to be performed. For example, depending on the specific oil or gas operation, the desired amount of time can range from a couple of hours to a few weeks.

According to an embodiment, the isolation devices 30 are able to withstand a specific pressure differential without losing their sealing capability. The pressure differential can be the bottomhole pressure of the subterranean formation 20 across the device. Formation pressures can range from about 1,000 to about 30,000 pounds force per square inch (psi) (about 6.9 to about 206.8 megapascals "MPa"). The pressure differential can also be created during oil or gas operations. For example, a fluid, when introduced into the wellbore 11 above or below the isolation device, can create a higher pressure above or below, respectively, of the isolation device. Pressure differentials can range from about 100 to over 10,000 psi (about 0.7 to over 68.9 MPa).

The methods include introducing the two or more isolation devices 30 into the wellbore 11. The step of introducing can include installing the wellbore isolation devices in the wellbore. According to an embodiment, the isolation devices are introduced such that they are capable of restricting or preventing fluid flow to another wellbore interval.

The methods also include causing or allowing each of the substances 51 to degrade. According to this embodiment, the bottomhole temperature of the wellbore 11 can be allowed or caused to increase to a temperature above the degradation temperature of the substances 51. The temperature can be allowed to increase, for example, due to a sufficient subterranean formation temperature. The temperature can also be caused to increase, for example, due to cessation of pumping a fluid having a lower temperature than the subterranean formation or due to pumping a heated fluid into the wellbore. The step of causing can include introducing an electrolyte into the wellbore 11.

The methods can also include flowing the portion of the substances 51 that underwent the degradation towards the wellhead of the wellbore 11. The step of flowing can also include flowing the entire isolation device 30 towards the wellhead of the wellbore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of removing two or more isolation devices comprising:
   introducing the two or more isolation devices into a location within a wellbore,
   wherein the two or more isolation devices create at least two wellbore intervals by blocking or restricting fluid communication between the at least two wellbore intervals,
   wherein each isolation device comprises a substance, wherein each of the substances degrades within the wellbore, wherein the degradation rate of each of the substances causes fluid communication to be restored between the wellbore intervals in a desired amount of time, wherein at least one of the isolation devices comprises a substance that is a polymer, wherein at least one of the isolation devices is a ball, wherein one or more of the isolation devices further comprise an additive, and wherein the additive is selected from the group consisting of an electrolytic compound, a pH maintainer, an insulator, or a combination thereof; wherein at least two isolation devices comprise a different composition; and
   causing or allowing each of the substances to degrade;
   allowing at least a portion of each of the two or more isolation devices to be removed from the location in a desired sequence; and
   restoring fluid communication between the at least two wellbore intervals in the desired amount of time.

2. The method according to claim 1, wherein at least one of the isolation devices is, a plug, a bridge plug, a wiper plug, a packer, or combinations thereof.

3. The method according to claim 1, wherein the isolation devices restrict or prevent fluid flow between the wellbore intervals.

4. The method according to claim 1, wherein at least one of the substances is a metal, a metal alloy, a polymer, or a combination thereof.

5. The method according to claim 4, wherein the polymer is a thermoplastic.

6. The method according to claim 4, wherein the metal alloy is a fusible metal alloy.

7. The method according to claim 4, wherein the metal or metal of the metal alloy is selected from the group consisting of lead, tin, bismuth, indium, cadmium, silver, gallium, zinc, antimony, copper, magnesium, aluminum, and combinations thereof.

8. The method according to claim 1, wherein one or more of the isolation devices further comprise a second substance.

9. The method according to claim 8, wherein the substance and the second substance form a eutectic, hypo-eutectic, hyper-eutectic composition, or fusible alloy.

10. The method according to claim 9, wherein the substance and the second substance have a degradation temperature less than or equal to the bottomhole temperature of the wellbore.

11. The method according to claim 8, wherein the substance and the second substance are part of a galvanic system.

12. The method according to claim 11, wherein the substance is the anode of the galvanic system and the second substance is the cathode of the galvanic system, wherein the substance undergoes galvanic corrosion.

13. The method according to claim 11, wherein the galvanic system further comprises an electrolyte, and wherein the electrolyte is a wellbore fluid or a reservoir fluid.

14. The method according to claim 1, wherein the desired amount of time is approximately the same for each of the wellbore intervals.

15. The method according to claim 1, wherein the desired amount of time is different for at least two of the wellbore intervals.

16. The method according to claim 1, wherein one or more of the isolation devices further comprise at least one layer of a coating.

17. The method according to claim 16, wherein the coating is selected such that the coating either dissolves in wellbore fluids or melts at the bottomhole temperature of the wellbore.

18. The method according to claim 17, wherein the coating is a wax, thermoplastic, sugar, salt, or polymer.

19. The method according to claim 1, wherein one or more of the isolation devices comprise multiple layers of the substance and: a coating; a second substance; an additive; or combinations thereof.

20. The method according to claim 19, wherein the number of layers and the thicknesses of each layer are selected to control the degradation rate of the substances.

21. A well system comprising:
a wellbore, wherein the wellbore comprises at least two wellbore intervals created by two or more isolation devices, and wherein fluid communication between the at least two wellbore intervals is blocked or restricted by the two or more isolation devices; and the two or more isolation devices,
wherein each isolation device comprises a substance wherein at least one of the isolation devices comprises a substance that is a polymer, wherein each of the substances degrades within the wellbore, and wherein the degradation rate of each of the substances causes fluid communication to be restored between the wellbore intervals in a desired amount of time, wherein at least one of the isolation devices is a ball, wherein one or more of the isolation devices further comprise an additive, and wherein the additive is selected from the group consisting of an electrolytic compound, a pH maintainer, an insulator, or a combination thereof; wherein at least two isolation devices comprise a different composition.

22. A method of removing two or more isolation devices comprising:
introducing the two or more isolation devices into a location within a wellbore,
wherein the two or more isolation devices create at least two wellbore intervals by blocking or restricting fluid communication between the at least two wellbore intervals,
wherein the two or more isolation devices comprise a substance that degrades within the wellbore, wherein at least one of the isolation devices comprises a substance that is a polymer, wherein at least one of the isolation devices is a ball, wherein one or more of the isolation devices further comprise an additive, and wherein the additive is selected from the group consisting of an electrolytic compound, a pH maintainer, an insulator, or a combination thereof; wherein at least two isolation devices comprise a different composition; and wherein at least two of the isolation devices have a different construction from each other;
causing or allowing each of the substances to degrade;
allowing at least a portion of each of the two or more isolation devices to be removed from the location in a desired sequence; and
restoring fluid communication between the at least two wellbore intervals in a desired amount of time.

23. The method according to claim 22, wherein the construction is different due to the substances being different.

24. The method according to claim 22, wherein at least two of the isolation devices comprise one or more layers of the substance, and wherein the construction is different due to the layers having different thicknesses.

* * * * *